(12) United States Patent
Mendoza (10) Patent No.: US 11,472,461 B2
(45) Date of Patent: Oct. 18, 2022

(54) TWO POSITION HAND TRUCK

(71) Applicant: Harper Trucks, Inc., Wichita, KS (US)

(72) Inventor: José Angel Caceres Mendoza, Wichita, KS (US)

(73) Assignee: HARPER TRUCKS, INC., Wichita, KS (US)

( * ) Notice: Subject to any disclaimer, the term of this patent is extended or adjusted under 35 U.S.C. 154(b) by 128 days.

(21) Appl. No.: 16/812,336

(22) Filed: Mar. 8, 2020

(65) Prior Publication Data
US 2020/0283049 A1    Sep. 10, 2020

Related U.S. Application Data

(60) Provisional application No. 62/815,779, filed on Mar. 8, 2019.

(51) Int. Cl.
*B62B 5/06* (2006.01)
*B62B 1/00* (2006.01)

(52) U.S. Cl.
CPC .............. *B62B 5/06* (2013.01); *B62B 1/002* (2013.01); *B62B 1/008* (2013.01); *B62B 2205/12* (2013.01); *B62B 2206/006* (2013.01)

(58) Field of Classification Search
CPC .. B62B 5/06; B62B 1/00; B62B 1/008; B62B 2205/01; B62B 2206/006
See application file for complete search history.

(56) References Cited

U.S. PATENT DOCUMENTS

| | | |
|---|---|---|
| 2,096,994 A | 10/1937 | Millen |
| 2,605,117 A | 7/1952 | Hooz |
| 3,655,212 A | 4/1972 | Krass |
| 3,702,016 A | 11/1972 | Keeze |
| 3,785,669 A * | 1/1974 | Doheny ............... B62B 1/002 280/47.18 |
| 3,850,441 A | 11/1974 | Peters et al. |
| 3,873,118 A | 3/1975 | Takagi |
| 4,009,891 A | 3/1977 | Jensen |
| 4,561,674 A | 12/1985 | Alessio |
| 4,921,270 A | 5/1990 | Schoberg |

(Continued)

FOREIGN PATENT DOCUMENTS

| | | |
|---|---|---|
| CN | 2283599 | 6/1998 |
| CN | 104608809 | 5/2015 |
| CN | 106004949 | 10/2016 |

OTHER PUBLICATIONS

PCT/US2020/021612 PCT International Search Report dated May 18, 2020.

*Primary Examiner* — Bryan A Evans
(74) *Attorney, Agent, or Firm* — Robert Blinn (57) ABSTRACT

A hand truck with main wheels and a toe plate also includes a handle assembly that is mounted to the frame of the hand truck so that the handle assembly is able to rotate and slide relative to the truck frame. The hand truck may be arranged in a first upright dolly position in which the handle assembly is generally aligned with the truck frame and a second cart position in which the truck frame is generally horizontal and the handle assembly is extended and rotated so that it is upright and normal relative to the truck frame. A latch assembly mounted to the truck frame is able to releasably receive and secure the handle assembly in the first upright dolly position.

5 Claims, 9 Drawing Sheets

(56) References Cited

U.S. PATENT DOCUMENTS

| | | | |
|---|---|---|---|
| 5,228,716 A | 7/1993 | Dahl | |
| 5,941,543 A | 8/1999 | Kazmark, Jr. | |
| 6,234,497 B1 | 5/2001 | Strahler, Sr. | |
| 6,308,967 B1 | 10/2001 | Stallbaumer et al. | |
| 6,328,319 B1 | 12/2001 | Stabler, Sr. | |
| 6,364,328 B1 * | 4/2002 | Stahler, Sr. | B62B 1/002 280/47.18 |
| 6,588,775 B2 * | 7/2003 | Malone, Jr. | B62B 1/002 280/47.18 |
| 8,100,430 B2 | 1/2012 | Meyers et al. | |
| 8,454,033 B2 | 6/2013 | Tsai | |
| 8,465,046 B2 | 6/2013 | Meyers et al. | |
| 9,096,249 B2 | 8/2015 | Gibson | |
| 9,139,214 B2 | 9/2015 | Rich et al. | |
| 9,211,894 B2 | 12/2015 | Gibson | |
| 9,365,225 B2 | 6/2016 | Henao | |
| 9,637,149 B1 | 5/2017 | Wang | |
| 9,688,298 B1 | 6/2017 | Su | |
| 9,969,411 B2 | 5/2018 | Belotti | |
| 10,118,633 B2 | 11/2018 | Gibson | |
| 2008/0197590 A1 | 8/2008 | Tsai | |
| 2012/0242063 A1 | 9/2012 | Bruckner | |
| 2016/0236699 A1 | 8/2016 | Wang | |
| 2016/0272229 A1 | 9/2016 | Bruckner | |
| 2018/0346009 A1 * | 12/2018 | Mendoza | B62B 1/12 |

* cited by examiner

TWO POSITION HAND TRUCK

RELATED APPLICATIONS

This application claims the benefit of U.S. Provisional Patent Application No. 62/815,779 filed on Mar. 8, 2019, which is incorporated herein by reference in its entirety.

FIELD

This application relates to a hand truck that is able to be used in two positions.

BACKGROUND

Prior art hand trucks are known that are able to be used in more than one position. Hand trucks are often used upright configuration in which the hand truck is supported by its main wheels and pushed about by means of a handle that is generally parallel to the hand truck frame or an extension of the hand truck frame. Some hand trucks have a repositionable handle that may be mounted either parallel to the hand truck frame or at a right angle to the hand truck frame, opposite from the main wheels. Such hand trucks also have a second set of wheels that are spaced away from the main wheels so that the hand truck may be used as a four-wheeled cart. Other hand trucks have handle assemblies that also carry caster wheels at their lower ends to provide the second set of wheels. It is desirable to have a hand truck that is able to be quickly transformed between the above described upright dolly mode and the horizontal cart mode. Accordingly, a need exists for a hand truck that is able to be quickly transformed between an upright dolly mode and a horizontal cart mode.

SUMMARY

The above described need is addressed by a hand truck that includes a truck assembly and a handle assembly. The truck assembly includes a frame that has a proximate end and a distal end. A toe plate is mounted to the proximate end of the truck frame. A pair of main wheels are also mounted to the truck frame adjacent to the proximate end of the truck frame.

The handle assembly includes a handle member that presents a handle portion at one end and a handle wheel assembly at the opposite end. The handle wheel assembly includes a transverse member and caster wheels. The caster wheels are preferably mounted at opposite ends of the transverse member. The handle member is mounted to the truck frame in such a fashion that it can rotate and slide relative to the truck frame between a first dolly position in which the handle member is retracted and generally aligned with the truck frame and a second cart position in which the handle member is extended and generally normal to the truck frame. When the handle assembly is in the second hand cart position, the hand truck is supported by its main wheels and the caster wheels of the handle wheel assembly so that the hand truck may be used as a hand cart.

A latch assembly is also mounted to the frame of the truck assembly. The latch assembly presents a latch bracket that is biased to move in a biased direction and that is able to be manually moved against the biased direction. The latch bracket is shaped to receive and capture the transverse member of the handle wheel assembly when the handle assembly is slid and rotated to the first upright dolly position thereby securing the handle assembly in the first, upright dolly position. The latch bracket is also shaped to release the transverse member of the handle wheel assembly when manual pressure is applied to the latch bracket to cause the latch bracket to move opposite the biased direction. When the transverse member of the handle wheel assembly is released, the handle assembly is able to rotate and slide into the second hand cart position.

DETAILED DESCRIPTION

Figure 1:
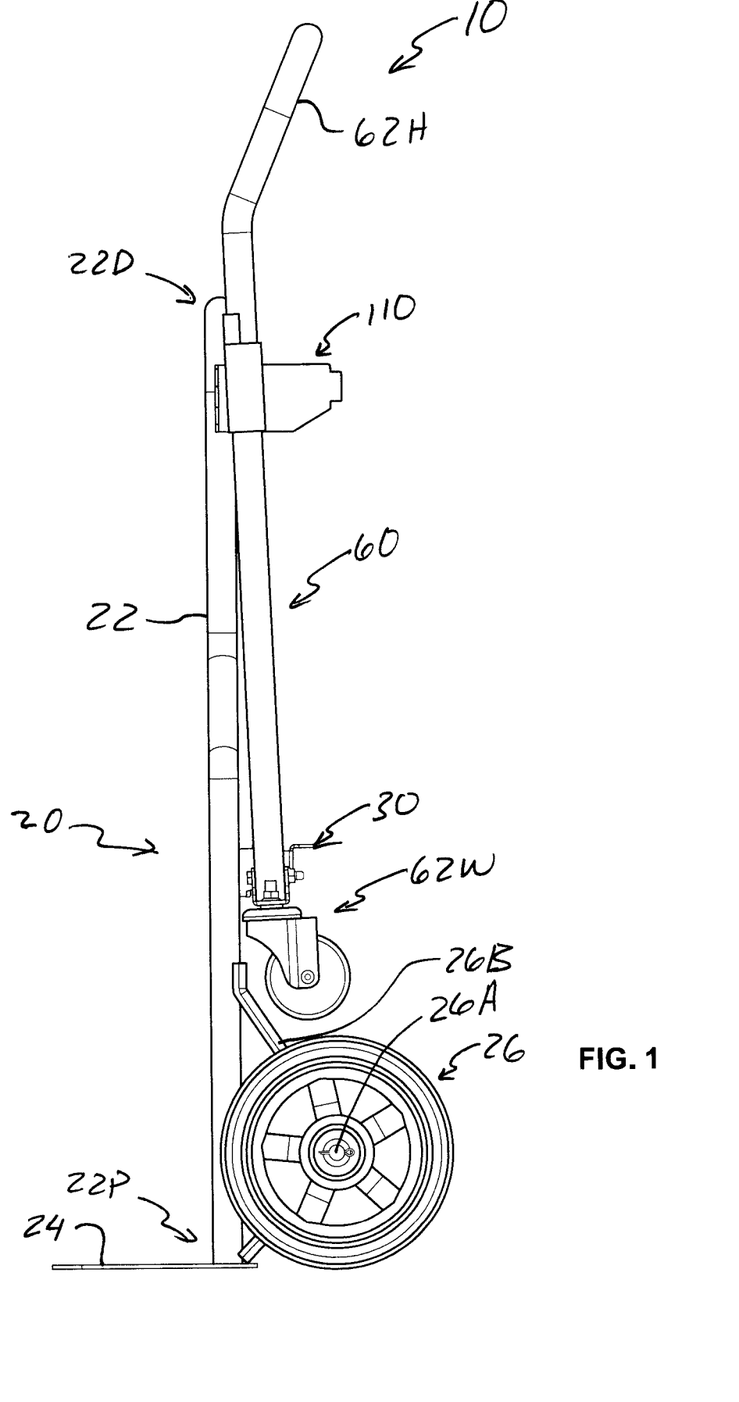
FIG. 1 is a side view of one embodiment of a two position hand truck shown in a first dolly position.

Referring to the drawings, FIG. 1 shows one embodiment of a two-position hand truck 10. As can be seen in FIG. 1, hand truck 10 includes a truck assembly 20 and a handle assembly 60.

Figure 2:
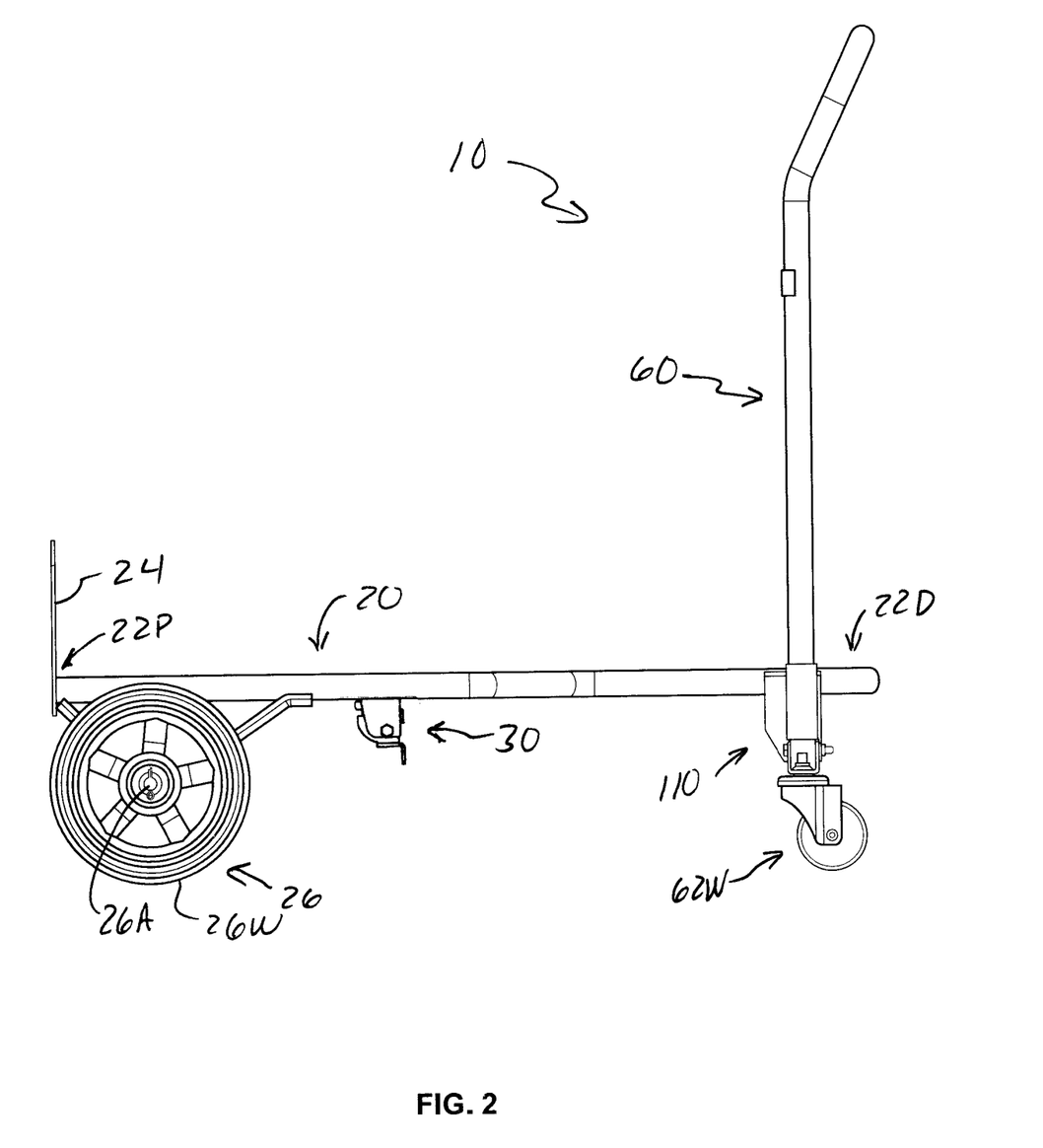
FIG. 2 is a side view of one embodiment of the two position hand truck shown in a second cart position.

As can be seen in FIGS. 1 and 2, truck assembly 20 includes a truck frame 22 that extends between a proximate end 22P and a distal end 22D. In this example, a toe plate 24 is mounted to proximate end 22P of truck frame 22. A main wheel assembly 26 is mounted to truck frame 22 adjacent to its proximate end 22P. Main wheel assembly 26 includes wheels 26W that are mounted to a transverse axle 26A that, in turn, is mounted to a pair of wheel assembly brackets 26B that are mounted to the opposite sides of frame 22. A latch assembly 30 is mounted to truck frame 22 between proximate end 22P and distal 22D.

Handle assembly 60 includes a handle member 62 that presents a handle portion 62H at one end and a wheel assembly 62W at the opposite end. Wheel assembly 62W includes a transverse member 62WT and caster wheels 62WC. Caster wheels 62WC are preferably mounted at opposite ends of transverse member 62WT. Each caster wheel 62WC is preferably of the type that is able to rotate about an axis that is generally normal to the rotation axis the wheel. As can be best seen in FIG. 4, in this example, transverse member 62WT is configured as a channel that presents two opposite upstanding flanges, namely a first flange 62WT1 and a second flange 62WT2. The channel and its upstanding flanges 62WT1 and 62WT2 are engagement features that are employed to secure the two positions of hand truck 10 as will be described below.

Figure 3:
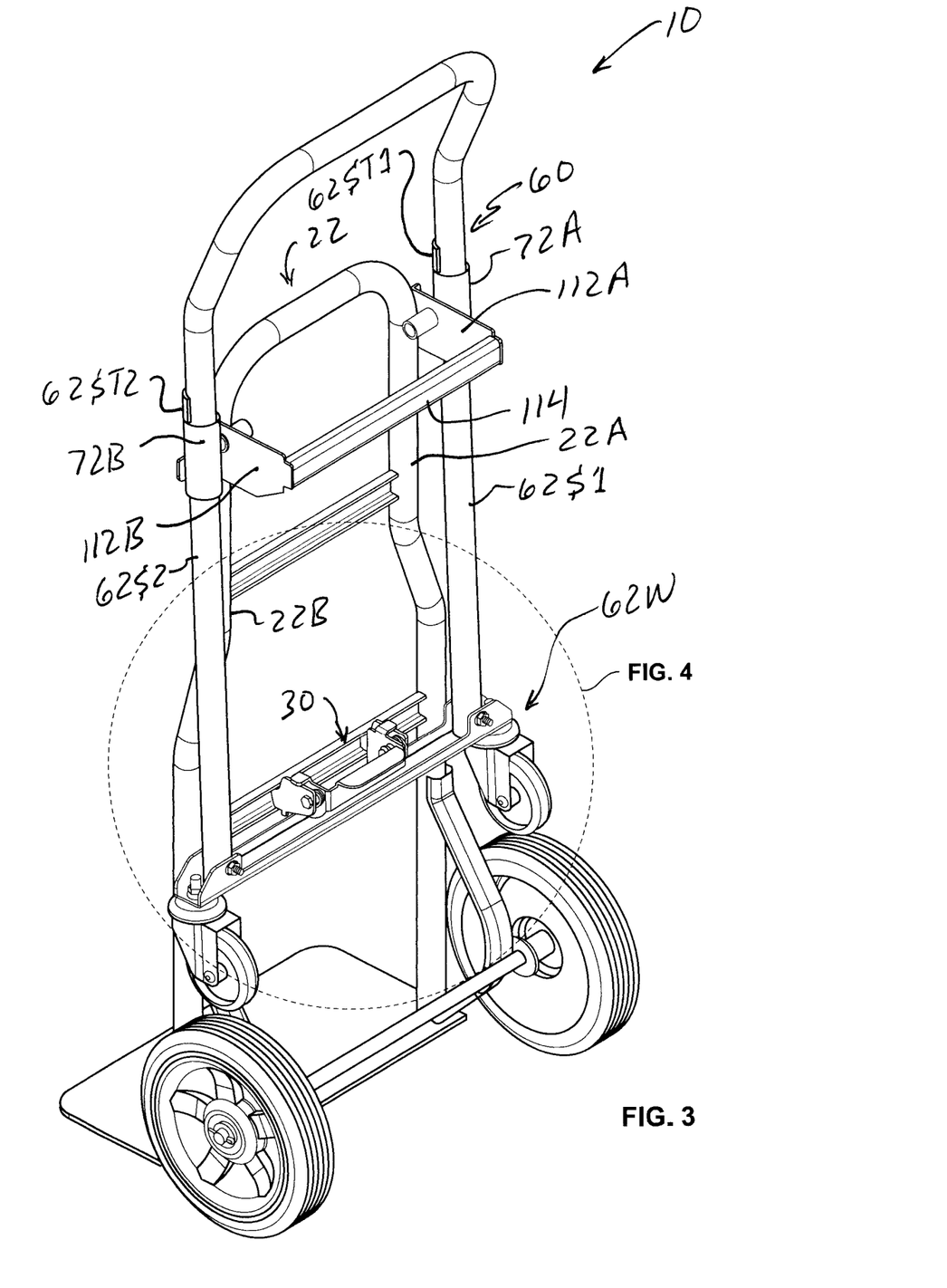
FIG. 3 is a perspective view of one embodiment of the two position hand truck.
Figure 7A:
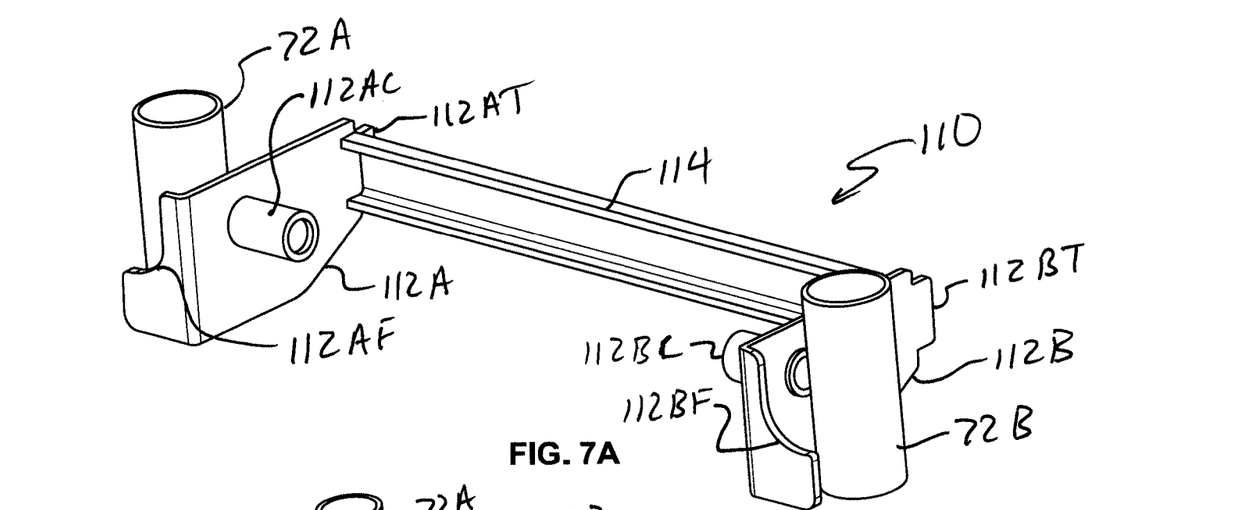
FIG. 7A is a perspective view of a head and slide tube assembly that provides the pivoting and sliding connection between the truck frame and the handle assembly.
Figure 7B:
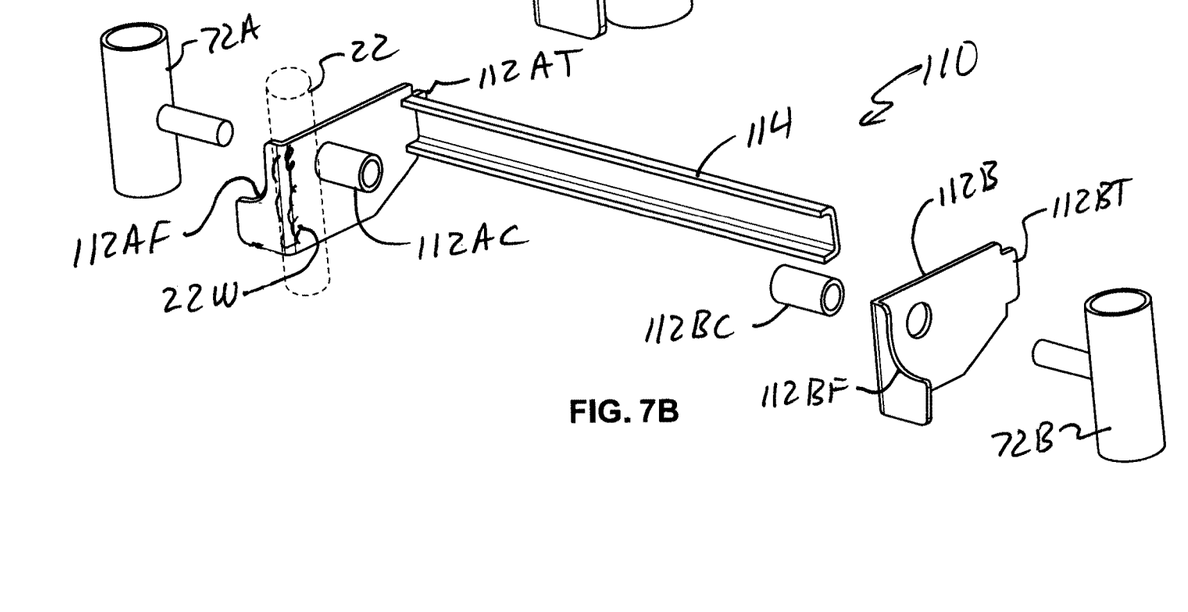
FIG. 7B is an exploded perspective view of the head and slide tube assembly shown in FIG. 7A.

As can be seen in FIGS. 3, 7A and 7B, handle assembly 60 is mounted to truck frame 22 by a frame bracket assembly 110. To facilitate the rotation and sliding movement of handle assembly 60, a pair of handle slide collars 72A and 72B are arranged to receive handle side members 62S1 and 62S2 respectively of handle assembly 60 in a sliding manner. Slide collars 72A and 72B also present normally projecting pins 72P1 and 72P2 respectively. Frame bracket assembly 110 is mounted to truck frame 22 and includes two side brackets 112A and 112B and a transverse member 114 that is fixed to and that connects between side brackets 112A and 112B. Each side bracket 112A and 112B is fixed, preferably by welding, to opposite sides of the upper end of truck frame 22. As can be seen in FIG. 7B, side bracket 112A is welded to truck frame 22 (shown in phantom) by a weld 22W. The same is true (but not shown in FIG. 7B) for opposite side bracket 112B. In this example, each frame bracket 112A and 112B presents a collar 112AC and 112BC respectively which is fixed, preferably also by welding, to each respective frame bracket 112A an 112B. Collars 112AC and 112BC are arranged to receive pins 72P1 and 72P2 that project from slide collars 72A and 72B thereby mounting handle assembly 60 to truck frame 22 in a rotating fashion. Given that handle assembly 60 is able to slide within above noted slide collars 72A and 72B, also thereby mounting handle assembly 60 to truck frame 22 in a sliding fashion. Handle assembly is able to be mounted to truck frame 22 in a rotating fashion because the distal end of truck frame 22 is formed to have an outside width that is sufficiently less than the inside width of handle assembly 60 so that the distal end of truck frame 22 fits between the opposite side members 62S1 and 62S2 of handle assembly 60 with additional sufficient clearance for the components described above.

In this example, both the rotation of handle assembly 60 and the sliding movement of handle assembly relative to truck frame 22 is limited within ranges of movement. As can be seen in FIGS. 1, 2 and 3 as well as FIGS. 7A and 7B, the downward sliding movement of handle assembly 60 through slide collars 72A and 72B (shown in FIGS. 7A and 7B) is limited by a stop plates 62ST1 and 62ST2 that are welded to handle assembly side members 62S1 and 62S2 as shown in FIG. 3. As handle assembly 60 is rotated to the second cart position shown in FIG. 2, the degree of rotation of handle assembly 60 is limited by scallops 112AF and 112BF in the return flanges of brackets 112A and 112B respectively (shown in FIGS. 7A and 7B). The limit of rotation in the opposite direction as handle assembly 60 is rotated toward a first dolly position (if handle assembly 60 is fully retracted against stop plates 62ST1 and 62ST2) is governed by transverse member 62WT of wheel assembly 62 being captured by frame latch assembly 30. The configuration and operation of frame latch assembly 30 and how frame latch assembly 30 is arranged to receive and capture transverse member 62WT will be described in greater detail below.

Hand truck 10 is able to be secured in the second hand cart position shown in FIG. 2 because frame brackets 112A and 112B and transverse wheel member 62WT of handle wheel assembly 62 have corresponding features that receive each other when truck frame 22 and handle assembly 60 are arranged as shown in FIG. 2. As can be seen in FIGS. 7A and 7B, in this example, each frame bracket 112A and 112B presents a projecting tab 112AT and 112BT. In this example, frame brackets 112A and 112B are generally symmetrically identical and tabs 112AT and 112BT project in a normal direction away from truck frame 22. In this example, each of these tabs is shaped to be received by channel shaped transverse member 62WT of wheel assembly 62W when the handle assembly 60 is rotated and slid to the second cart position as shown in FIG. 2. Tabs 112AT and 112BT and corresponding transverse member 62WT of wheel assembly 62W that is channel shaped to receive tabs 112AT and 112BT provide just one example of how complementary features may be used to accomplish engagement in order to secure hand truck 10 in the second cart position shown in FIG. 2.

Truck frame 22 of truck assembly 20 carries a latch assembly 30 that is arranged to capture and release transverse member 62WT of wheel assembly 62W. When transverse member 62WT is captured as shown in FIGS. 1, 3, 4, 6A, 6B and 6C, when handle assembly 62 is secured in the first dolly position shown in FIGS. 1, 3, 6A and 6B. Latch assembly 30 is best understood by referring to FIGS. 4, 5A, 5B and 6C as well as FIGS. 8A-8E.

Figure 4:
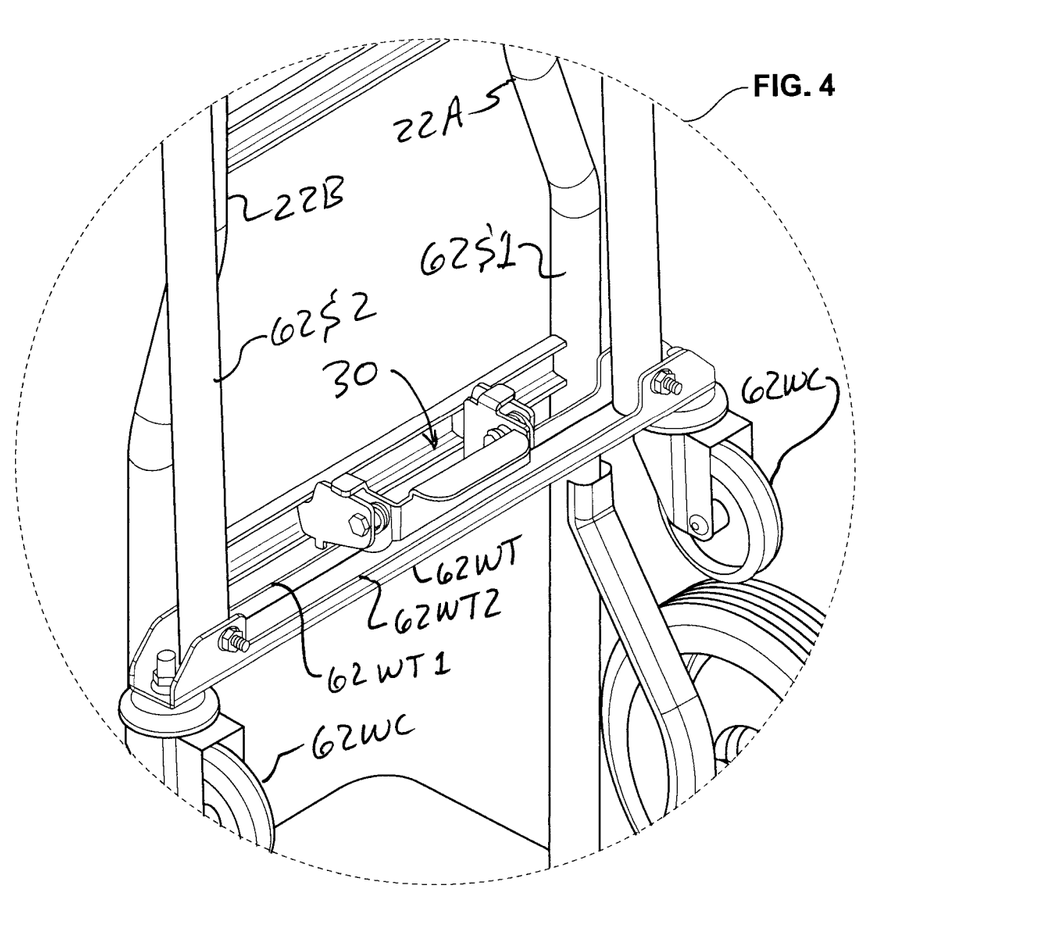
FIG. 4 is a close up perspective view showing detail A indicated in FIG. 3.
Figures 5A, 5B:
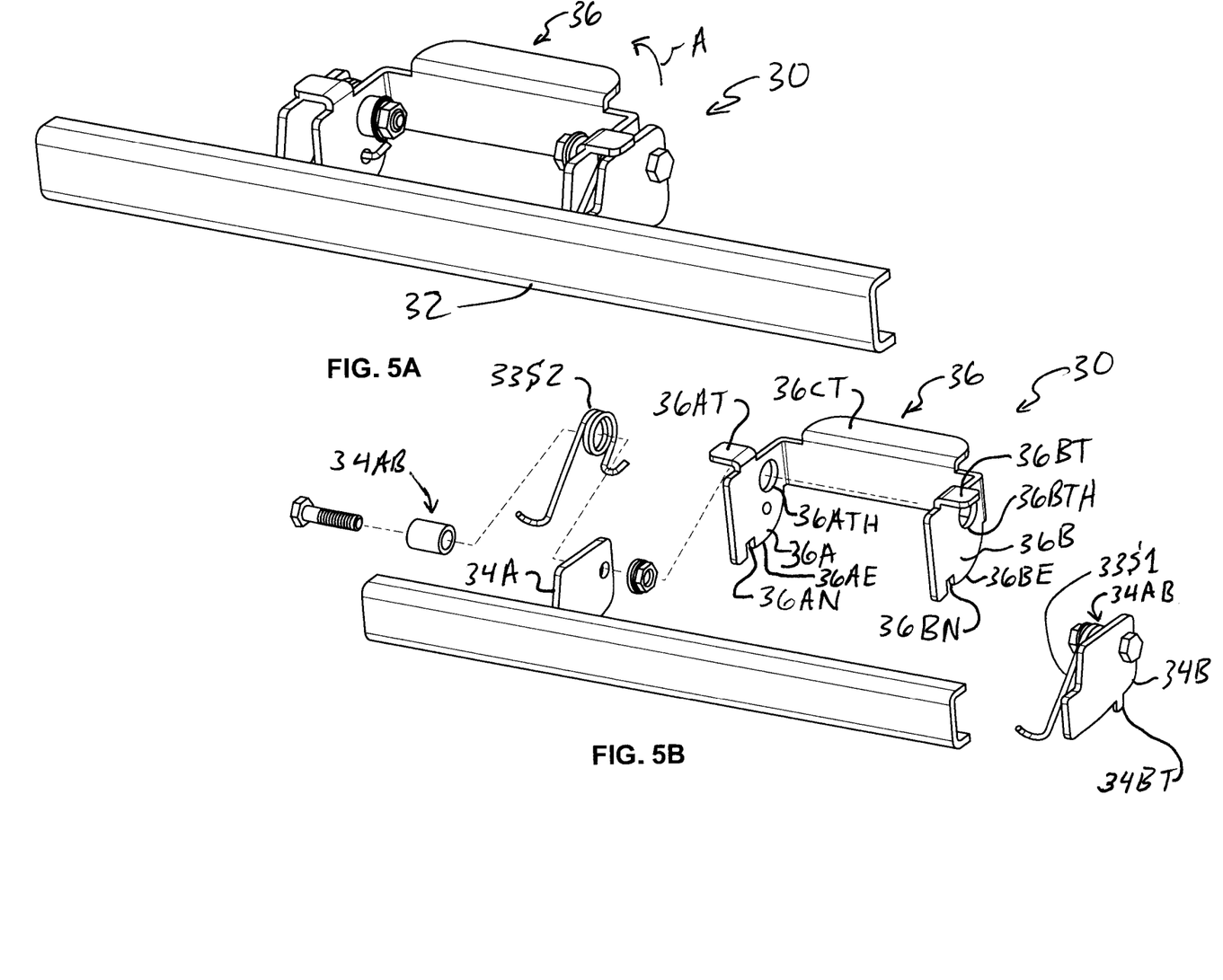
FIG. 5A is a perspective view of a latch assembly and its support member shown isolated from the truck frame of the two position hand truck.
FIG. 5B is an exploded perspective view of the latch assembly and its support member shown in FIG. 5A.
Figure 6A:
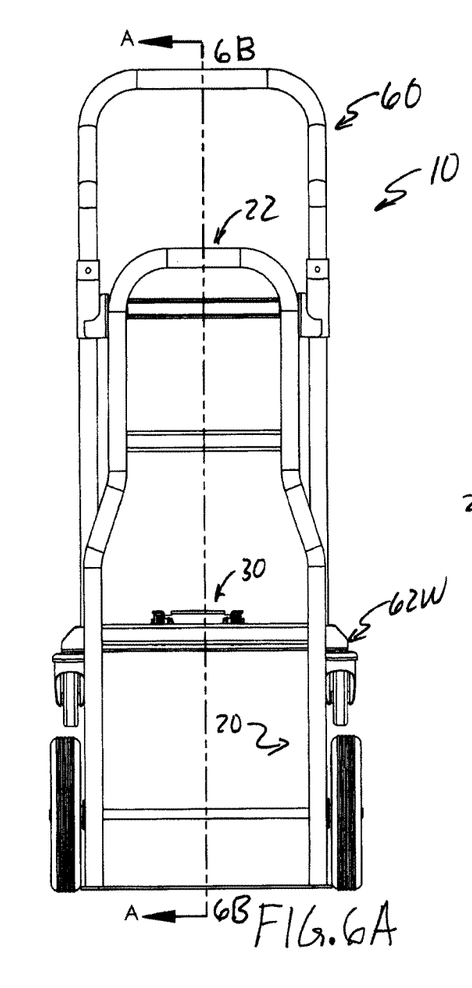
FIG. 6A is a front view of one embodiment of a two position hand truck showing the two position hand truck in a first dolly position.
Figures 6B, 6C:
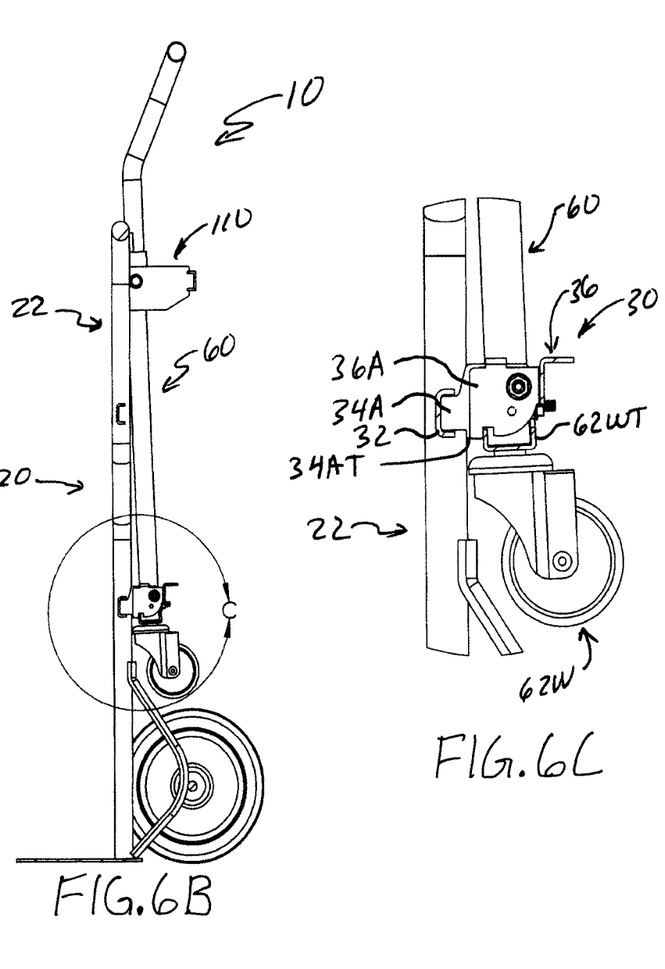
FIG. 6B is a cross section view of the two position hand truck shown in FIG. 6A taken from plane 6B indicated in FIG. 6A.
FIG. 6C is a magnified view of detail C indicated in FIG. 6B that provides a close-up view of the truck frame latch assembly shown engaging the transverse member of the wheel assembly of the handle assembly.

As can be seen in FIGS. 5A and 5B, latch assembly 30 includes a latch assembly support member 32, a pair of opposite latch bracket support members 34A and 34B and a latch bracket 36. As is shown in FIGS. 3 and 4, latch assembly support member 32 is fixed to truck frame 22, preferably by weldments, and extends between truck frame side members 22A and 22B. Latch bracket support members 34A and 34B are generally flat plates and are fixed to latch assembly support member 32 in a spaced apart and generally parallel manner as shown in FIG. 5A. Weldments are also preferred for fixing latch bracket support member 34A and 34B to latch assembly support member 32. Latch bracket 36, in this example, is a sheet metal flat pattern type part that has been formed to have two side flanges 36A and 36B and a handle portion 36C extending between side flanges 36A and 36B. In this example, handle portion 36C presents a handle tab 36CT and side flanges 36A and 36B each present a generally normally extending stop tab 36AT and 36BT respectively. Side flanges 36A and 36B also present bottom edges 36AE and 36BE respectively that further present notches 36AN and 36BN respectively.

By referring to FIGS. 5A and 5B, the skilled reader will understand how latch bracket 36 is mounted for rotation to latch bracket support members 34A and 34B. As can be seen in FIG. 5B, each latch bracket support member 34A and 34B carries a corresponding bolt and collar combination 34AB. The collars of bolt and collar combinations 34AB are adapted to be received by corresponding holes 36ATH and 36BTH that are defined in side flanges 36A and 36B respectively of latch bracket 36. The skilled reader will note that latch bracket support members 34A and 34B are offset from side flanges 36A and 36B of latch bracket 36 respectively when latch assembly 30 is assembled. These offsets provide gaps for accommodating a pair of coiled springs 33S1 and 33S2 that are carried by the collar of bolt and collar combinations 34AB. Springs 33S1 and 33S2 communicate between bracket support members 34A and 34B and latch bracket 36 to bias latch bracket 36 in direction A (counter-clockwise) as indicated in FIG. 5A such that bottom edges 36AE and 36BE and notches 36AN and 36BN are rotated away from truck frame 22. This biased direction A (indicated in FIG. 5A) may also be understood as counter-clockwise in FIGS. 6C and 8A-8E. The skilled reader will also note when referring to FIGS. 5A and 5B that tabs 36AT and 36BT that extend outboard from latch bracket 36 are arranged to contact latch bracket support members 34A and 34B to arrest the biased rotation of latch bracket 36 in a predetermined position as shown in FIGS. 5A, 6C and 8A-8C. The skilled reader will further note that bracket support members 34A and 34B present optional downwardly extending tabs 34AT and 34BT that are located to stop flange 62WT1 of transverse member 62WT to thereby limit the rotation of handle assembly 60.

It now remains to consider how latch assembly 30 is operated in order to receive, secure and release handle assembly 60. By referring to FIG. 5B, the skilled reader will be able to note that side flanges 36A and 36B of latch bracket 36 symmetrically present curved bottom edges 36AE and 36BE respectively. And, the skilled reader may also again observe that bottom edges 36AE and 36BE present notches 36AN and 36BN respectively.

Figures 8A, 8B, 8C:
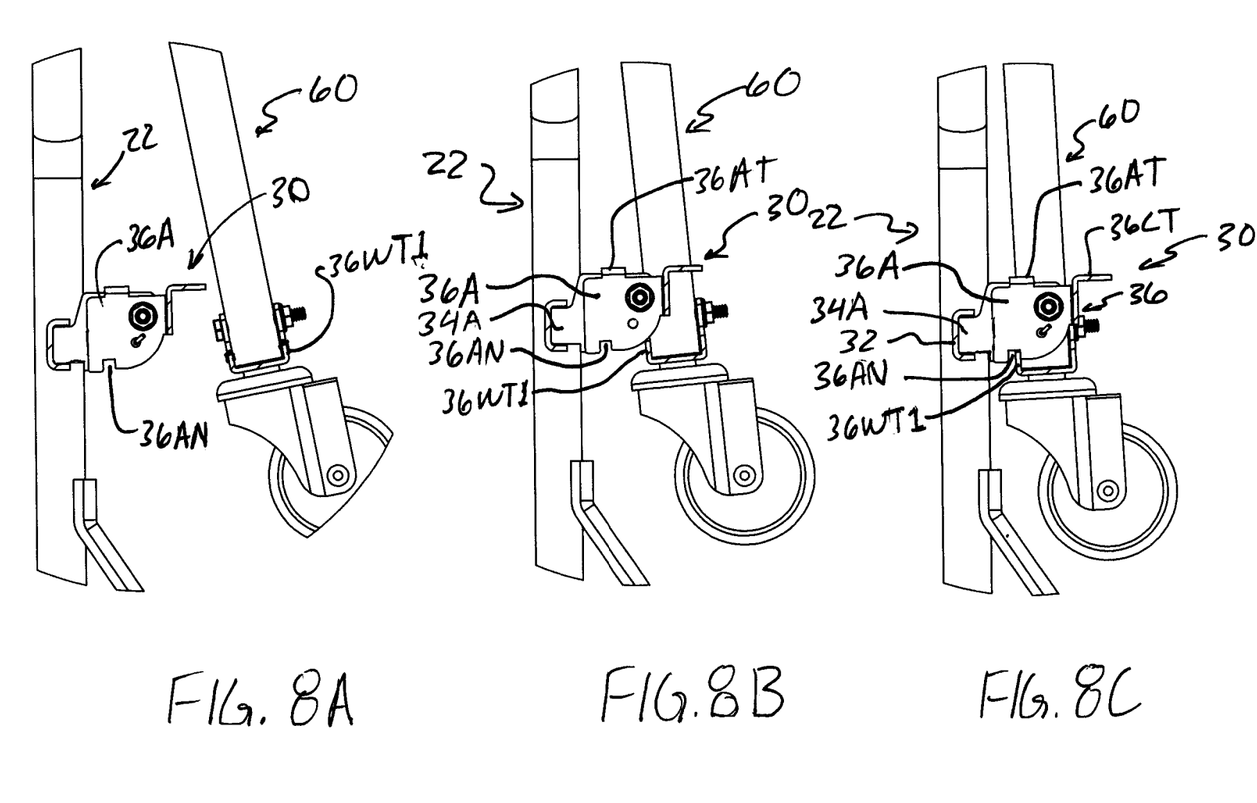
FIG. 8A is side view of the latch assembly and the handle assembly showing the handle assembly approaching the latch assembly.
FIG. 8B is side view of the latch assembly and the handle assembly showing the handle assembly in contact with the latch assembly such that the leading flange of the transverse member of the wheel assembly is being received by the notches presented by the lower edges of the latch bracket side flanges.
FIG. 8C is side view of the latch assembly and the handle assembly showing the leading flange of the transverse member of the wheel assembly after it has been received by the notches presented by the lower edges of the latch bracket side flanges with the handle assembly in a secured position.

The way latch assembly 30 is able to receive and secure transverse member 62WT of handle assembly 60 may be best understood by referring to FIGS. 8A-8C. FIG. 8A is taken from the same plane as is FIG. 6C. In FIG. 8A (as is the case for FIGS. 8B-8E), handle assembly 60 has been slid to the first dolly position such that slide collars 72A and 72B of frame bracket assembly 110 have contacted stops 62ST1 and 62ST1 that are fixed to side handle members 62S1 and 62S2 of handle assembly 60. This places the upper edge of flange 62WT1 of transverse member 62WT at the correct relative elevation for being received by latch assembly 30. Also, in FIG. 8A, latch bracket 36 is biased counterclockwise such that tabs 36AT and 36BT are in contact with the top surfaces of latch support members 34A and 34B respectively. In FIG. 8B, an operator has pushed handle assembly 60 until the leading flange 62WT1 of member 62WT at the lower end of handle assembly 60 has begun to make initial contact with lower curved edges 36AE and 36BE of latch bracket 36. As this contact continues, latch bracket 36 is rotated against its bias in a clockwise direction to a position that is very similar if not identical to that shown in FIG. 8D. At this point, notches 36AN and 36BN at the lower end of latch bracket 36 receive flange 62WT1 of transverse member 62WT. As can be seen in FIG. 8C, once notches 36AN and 36BN receive flange 62WT1, latch bracket 36 will, because of its spring bias, return to the position shown in FIG. 6C and as shown in FIG. 8C. Latch assembly 30 has received and has secured handle assembly 60 in the first dolly position shown in FIG. 1. Manual manipulation of latch assembly 30 and handle assembly 60 will be required to release handle assembly 60 to move it to a position other than the first dolly position shown in FIG. 1.

Figure 8D:
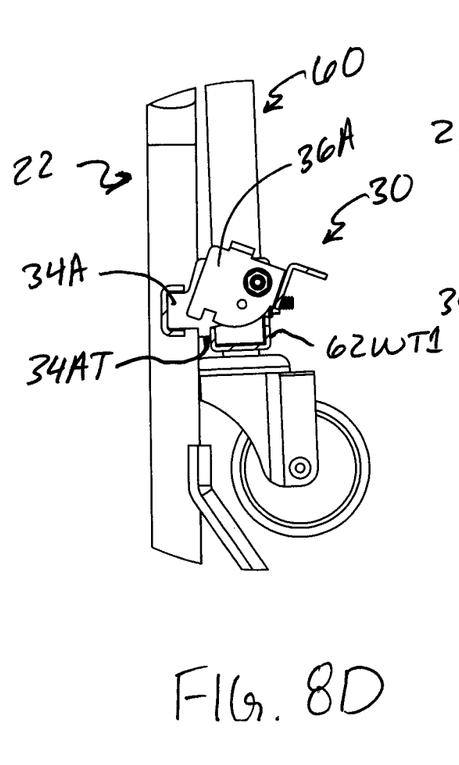
FIG. 8D is side view of the latch assembly and the handle assembly showing the leading flange of the transverse member of the wheel assembly as it is being ejected from the notches presented by the lower edges of the latch bracket side flanges as manual pressure is being applied to the latch bracket against its biased direction.
Figure 8E:
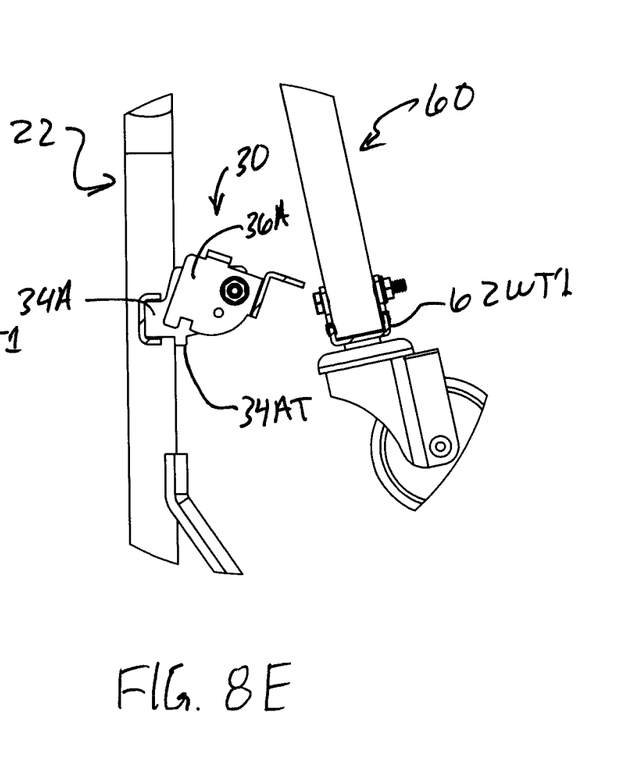
FIG. 8E is side view of the latch assembly and the handle assembly showing the leading flange of the transverse member of the wheel assembly after it has been manually pulled away from the latch bracket thereby making it possible to rotate the handle assembly away from the truck frame toward a second cart position.

The way latch assembly 30 and handle assembly 60 may be manipulated to release transverse member 62WT of handle assembly 60 from latch assembly 30 may be best understood by referring to FIGS. 8C-8E. In FIG. 8C handle assembly 60 has been received and secured as described above. In FIG. 8D, tab 36CT has been depressed with a force P to cause clockwise rotation of latch assembly 30 against the above noted spring bias. As can be seen in FIG. 8D, this action rotates notches 36AN and 36BN up and away from leading flange 62WT1 of transverse member 62WT of handle assembly 60 thereby disengaging bracket assembly 30 from handle assembly 60. Flange 62WT1 is no longer captured by notches 36AN and 36BN. Then, the operator, by pulling on handle assembly 60 and rotating handle assembly 60 in a counter-clockwise direction toward a position as shown in FIG. 8E is able to rotate transverse member 62WT away from latch assembly 30, thereby disengaging handle assembly 60 from latch assembly 30. Once handle assembly 60 is in the position shown in FIG. 8E, force P may be released to allow latch bracket assembly 30 to return to the position shown in FIGS. 6C and 8A. Once handle assembly 60 is translated away from latch bracket assembly 30, it is possible to change the relative positions of truck frame 22 and handle assembly 60 from the first dolly position shown in FIG. 1 to the second cart position shown in FIG. 2.

As can be seen from the above description, hand truck 10 meets the needs noted above by providing a hand truck that can be rapidly reconfigured in a first dolly configuration and a second cart configuration. While certain options were disclosed above for accomplishing a rotating and sliding connection between a truck frame and a handle assembly and while certain features were presented as examples for providing ways for various components to engage and release, the skilled reader should understand that various corresponding features may be selected for secure engagement and release between various assemblies and parts.

The applicant has also found that steel tubing and steel plate and similar materials are suitable for the structural components of a hand truck such as hand truck 10 and that welding is a preferred process for fixing together parts within assemblies for such a hand truck. However, those who are skilled in the art may find other materials and processes.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A hand truck, comprising:
 a hand truck frame having side members and a handle assembly that is at least rotatably mounted to the truck frame such that the handle assembly is able to rotate between a first position in which the handle assembly is adjacent to the truck frame and a second position in which the handle assembly is rotated away from being adjacent to the truck frame,
 a latch assembly that is mounted to the truck frame which is arranged to releasably receive and releasably secure the handle assembly in the first position, the latch assembly including a latch assembly support member that is fixed to the truck frame, a pair of opposite latch bracket support members and a latch bracket, the latch assembly support member being fixed to and extending between the truck frame side members, the latch bracket support members being generally flat plates that are fixed to latch assembly support member in a spaced apart parallel manner and having top edges, the latch bracket having two side flanges and a handle portion extending between the side flanges, each side flange also having top edges which have normally extending stop tabs and having curved bottom edges that include opposite corresponding notches, the latch bracket being rotatably mounted to the latch bracket support members and biased to rotate in a direction such that the top edges of the latch bracket side flanges rotate toward the truck frame, the rotation of the latch bracket being arrested as the normally extending stop tabs of the latch bracket side flanges contact the top edges of the latch bracket support members, the handle assembly further including at least one horizontal transverse cross member that presents at least one upwardly extending edge, such that the handle assembly is able to be rotated such that the upwardly extending edge is able to be swung toward the truck frame, the upwardly extending edge of the horizontal cross member of the handle assembly being arranged such that the upwardly extending edge is able to contact the curved bottom edges of each side flange of the latch bracket until the upwardly extending edge is received by the opposite corresponding notches in the bottom edges of the latch bracket side members thereby retaining the handle assembly in a position that is proximate to the truck frame, the handle assembly also being arranged such that manual pressure against its bias rotates the opposite corresponding notches so that the notches disengage the upwardly extending edge of the horizontal cross member of the handle assembly so that the subsequent manual rotation of the handle assembly away from the frame results from the released handle assembly being rotated away from the first position and away from the truck frame.

2. The hand truck of claim 1, wherein;
the handle assembly is able to rotate relative to the frame about a fixed axis.

3. The hand truck of claim 1, wherein;
the latch bracket is able to rotate relative to the frame about a fixed axis.

4. The hand truck of claim 1, wherein;
the handle assembly is able to rotate relative to the frame about a fixed axis, and the latch bracket is able to rotate relative to the frame about a fixed axis.

5. The hand truck of claim 4, wherein;
the handle assembly is able to slide relative to the frame.

* * * * *